United States Patent
Miller et al.

(10) Patent No.: US 7,665,256 B2
(45) Date of Patent: *Feb. 23, 2010

(54) METHOD AND APPARATUS FOR FIRESTOPPING A THROUGH-PENETRATION

(75) Inventors: Stephen A. Miller, St. Paul, MN (US); Brandon L. Cordts, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 917 days.

This patent is subject to a terminal disclaimer.

(21) Appl. No.: 10/925,271

(22) Filed: Aug. 24, 2004

(65) Prior Publication Data
US 2006/0053710 A1    Mar. 16, 2006

(51) Int. Cl.
*E04C 2/52* (2006.01)
(52) U.S. Cl. .................. 52/220.8; 52/317; 52/220.1; 52/784.11; 52/232; 52/218
(58) Field of Classification Search ............... 52/317, 52/220.8, 220.1, 784.11, 220.7, 232, 218
See application file for complete search history.

(56) References Cited

U.S. PATENT DOCUMENTS

| | | | | |
|---|---|---|---|---|
| 4,304,079 A | * | 12/1981 | Thorsten | 174/483 |
| 4,493,173 A | | 1/1985 | Kohaut | |
| 4,496,790 A | | 1/1985 | Spencer | |
| 5,373,932 A | * | 12/1994 | Stobich et al. | 198/502.1 |
| 6,928,777 B2 | * | 8/2005 | Cordts | 52/220.8 |
| 2004/0016191 A1 | | 1/2004 | Whitty | |
| 2004/0093815 A1 | | 5/2004 | Cordts | |

FOREIGN PATENT DOCUMENTS

| | | |
|---|---|---|
| DE | 90 03 636 | 5/1990 |
| EP | 0 869 303 B1 | 10/1998 |

* cited by examiner

*Primary Examiner*—Jeanette Chapman
(74) *Attorney, Agent, or Firm*—Kenneth B. Wood (57) ABSTRACT

A method and apparatus for creating firestopping barrier in a partition, such as a wall, floor, or ceiling, that is mounted adjacent the opening includes a housing containing a central opening. The cross-sectional area of the housing is greater than the cross-sectional area of the through-penetration opening, and the housing is arranged external to the through-penetration opening with at least a portion thereof extending along a surface of the partition thereby to allow the housing to be installed adjacent the through-penetration opening. Firestop material is arranged within the housing.

21 Claims, 4 Drawing Sheets

METHOD AND APPARATUS FOR FIRESTOPPING A THROUGH-PENETRATION

FIELD OF THE INVENTION

The present invention relates generally to firestopping and, more particularly, to a method and apparatus for firestopping an opening in, for example, a wall, floor, or ceiling, which has items such as cables or wires passing through it.

BACKGROUND OF THE INVENTION

One way smoke and fire spreads from one part of a building to another is through passages or openings, often referred to as through-penetrations, in floors, walls, ceilings, or the like. Such openings are provided in the building to allow cables, wires, pipes or the like to pass from one area of the building to another.

One technique currently used to prevent the spread of fire and passage of smoke through such openings uses intumescent sheets that are cut to follow the contour of the penetrating cables. A bead of moldable intumescent putty is then provided along the perimeter of the sheets. Other techniques utilize intumescent bricks or pillows.

While such techniques are generally satisfactory for resisting the spread of fire and preventing the passage of smoke from one room or compartment of a structure to another, installation is time consuming and expensive. In addition, when intumescent sheets, bricks, or pillows are used, they must be mechanically attached to, or physically compressed in, the opening, or both, to pass the hose stream portion of the fire test defined in ASTM E814-02. In addition, firestops fabricated in this manner do not lend themselves to repeated re-entry without the likelihood of material damage or damage to the perimeter of the opening, do not remain in the opening during the cable work leading to potential omission of essential fire stop material upon re-closure, and do not lend themselves to ease of inspection without removal of at least a portion of the completed assembly. In addition, removing cables from a typical through-penetration currently requires the existing intumescent material to be removed, discarded, and replaced completely or in part with new intumescent material. This procedure is time consuming, expensive, and wasteful. Because through-penetrations may be opened and closed numerous times during the service life of an opening to add or remove items from the opening, the costs associated with such systems can be significant.

Furthermore, such systems, installed in floor openings, require cover plates to meet fire and architectural demands. Cover plates are typically made of 0.25 inch (6.4 millimeters) steel which makes them difficult to modify after initial fabrication and installation. Typically, such cover plates must be removed from the area of the through-penetration or even from the building to make necessary modifications. In addition, adjusting the contour of the cover to match the profile of the new cable bundle can be time consuming.

Techniques for fire stopping through-penetrations are also known in the prior art. U.S. Pat. No. 4,496,790 (Spencer), for example, discloses a self-anchoring poke-thru wiring device for the extension of communication and/or electrical wiring through a passage in a floor designed to prevent the spread of fire from one side of the floor to the other.

U.S. Pat. No. 4,493,173 (Kohaut) discloses a cable passage closure and sealing device for positioning in an opening in a structure such as a floor or wall that is used for passing or connecting a cable or cables and cable conduits there through. The device automatically expands and seals itself and the cables and the cable conduits in the structural opening upon exposure to excess heat or fire.

U.S. Pat. No. 4,304,079 (Thorsten) discloses a cable penetration matrix structure comprising a plurality of individual penetration cells that is cast into the building floor during construction.

These prior devices and techniques, however, tend to suffer from one or more disadvantages, drawbacks or shortcomings. For examples, these prior devices are mounted in the opening making installation difficult and occupying space in the opening that could otherwise be used to pass items from one room of the building to another. Accordingly, there exists a need in the industry for a method and apparatus for firestopping a through-penetration that is easy to install, allows the maximum percentage of the opening to be used to pass items through the partition, and allows items passing through the opening to be readily added or removed. Such a firestop device can provide considerable long-term cost saving to firestop users over currently available systems and techniques.

SUMMARY OF THE INVENTION

The present invention provides a method and apparatus for firestopping an opening in a partition, such as a wall, floor, or ceiling, that is mounted adjacent the opening rather than in the opening itself such that little, if any, of the opening is blocked by the apparatus. That is, the apparatus is mounted on the floor surface such that the entire apparatus is located outside of the opening. In addition, the apparatus includes a central opening that corresponds to the opening in the partition.

The central opening typically has a cross-sectional area that is at least as large as the cross-sectional area of the through-penetration opening. More particularly, the cross-sectional area of the central opening in the apparatus is typically large enough to accommodate any firestop material and any other components and still have an open area that is at least as large as the cross-sectional are of the through-penetration opening. In this manner, the entire cross-sectional area of the through-penetration opening can be used to pass items such as cables through the partition. In addition, because the apparatus is mounted adjacent the opening, it can be easily and quickly installed, serviced or removed.

The apparatus is also adjustable to allow items passing through the opening to be quickly and easily added or removed. Once installed, the device preferably remains in the place for the life of the opening. Thus, the device allows for the quick and easy installation or removal of items passing though the opening, but the device itself never needs to be removed or modified once it has been installed in the opening. The present invention finds particular application, for example, in the telecommunications industry where openings in walls, floors, and ceilings for cable passage are prevalent, and cables are frequently added to or removed from the opening.

In one aspect, the present invention provides a device for firestopping a through-penetration, a single membrane penetration or a blank opening in a partition comprising a housing containing a central opening, wherein the cross-sectional area of the housing is greater than the cross-sectional area of the through-penetration opening, and further wherein the housing is arranged external to the through-penetration opening with at least a portion thereof extending along a surface of the partition thereby to allow the housing to be installed adjacent the through-penetration opening, and firestop material arranged within the housing.

In more specific embodiment, the housing includes a front wall, a rear wall and a pair of side walls defining the central opening, and the housing central opening is greater than the through-penetration opening.

In another embodiment, the invention provides a device for firestopping an opening in a partition comprising a housing containing a central opening having a size at least corresponding to the size of the partition opening such that no portion of the partition opening is blocked by the housing, and firestop material arranged within the housing.

In another aspect, the present invention provides a cable penetration structure, comprising a partition having first and second opposed major surfaces and containing an opening extending from the first major surface to the second major surface and a firestop device arranged adjacent the partition remote from the partition opening, whereby no portion of the firestop device enters the partition opening.

In yet another aspect, the present invention provides a method of firestopping an opening in a partition having at least one penetrating item passing there through, the method comprising the step of arranging a firestop device including a housing having a central opening aligned with the partition opening external to the partition opening, the firestop device including firestop material arranged to expand and fill any open space in the central opening upon exposure to fire-like conditions.

BRIEF DESCRIPTION OF THE DRAWINGS

The present invention will be further described with reference to the accompanying drawings, in which.

DETAILED DESCRIPTION

For the purpose of this invention, the following terms are used herein:

"firestop material" refers to intumescent, endothermic, and ablative materials useful in resisting the spread of fire and smoke from one compartment of a structure to another. A firestop material may include an intumescent compound, an endothermic compound, or both an intumescent compound and an endothermic compound;

"intumescent material" refers to a material that expands to at least about 1.5 times its original volume upon heating to temperatures typically encountered in fire-like conditions.

"endothermic material" refers to a material that absorbs heat, typically by releasing water of hydration, by going through a phase change that absorbs heat (i.e. liquid to gas), or by other physical or chemical change where the reaction requires a net absorption of heat to take place.

Referring now to the drawings, FIGS. 1-4 show a firestop device 2 arranged adjacent an opening or through-penetration 4 in a partition 6 such as, for example, a floor or a ceiling. A plurality of individual items 8a, such as cables or wires, form a bundle 8 of items passing through the through-penetration 4. The device includes a housing 10 having a front wall 10a, a rear wall 10b and a pair of side walls 10c, 10d which together define a central opening 12 best seen in FIG. 2. As used herein "central opening" refers to the interior perimeter dimension of the housing 10 that allows access to the through-penetration opening 4.

In the illustrated embodiment, the device 2 has a generally rectangular shape. It will be recognized that the size and shape of the device 2 may be modified to match the size and shape of the through-penetration 4. For example, the device 2 may have a square shape. It will also be recognized that the shape of the device 2 need not match the shape of the through-penetration 4. A device 2 having a square shape, for example, may be used with a circular through-penetration. The housing 10 is typically formed of metal, such as steel or aluminum, but other materials that can withstand fire-like conditions such as masonry materials including cement or concrete, may also be used.

To maximize the percentage of the through-penetration 4 that can be used to pass items 8 through the partition 6, the device 2 is typically sized so that the central opening 12 is at least as large as the through-penetration 4. Because a certain percentage of the central opening 12 may be occupied by other hardware or materials such as firestop material, the housing 10 is preferably oversized so that the central opening 12 can accommodate the hardware or materials and still allow the entire cross-sectional area of the partition through-penetration 4 to be used for passing items 8 through the partition 6.

Many existing through-penetrations 4 include threaded fasteners 13 such as bolts that are provided to secure a saddle or other items in the through-penetration 4. In the illustrated embodiment, the device 2 includes flanges 16 that extend outwardly from the lower ends of the side walls 10c,d that allow the device 2 to be secured to the existing threaded fasteners 13. Accordingly, the flanges 16 contain through bores 17 corresponding with the existing threaded fasteners 13 such that the device 2 can be positioned over the threaded fasteners 13 and secured to the partition 6 with a nut 30.

Certain features of the device 2 described below are similar to features of the apparatus shown and described in U.S. Patent Publication No. 2004/0093815, the contents of which are hereby incorporated by reference.

A pair of elongated support rails 14a 14b extend along opposite sides of the housing 10 adjacent the inner surface of each side wall 10c, 10d and along opposite sides of the cable bundle 8. Adjustable firestop material 18 is movably connected with the support rails 14a, 14b. In addition, optional stationary firestop material 20a, 20b may be arranged along the inner surfaces of the side walls 10c, 10d of the housing 10. Alternatively, the firestop material may be in the form of pillows arranged in the housing.

The adjustable firestop material 18 is a single piece of material having a generally zigzag cross-section with a plurality of adjacent panels 18a each separated by an alternating fold line 22 which allows the adjustable firestop material 18 to be repeatably and reversibly extended and retracted. In this manner, the adjustable firestop material 18 can be moved between a retracted condition (not shown), wherein a leading edge 24 of the adjustable firestop material 18 is spaced from the cable bundle 8, and an extended condition wherein the leading edge 24 of the adjustable firestop material 18 abuts the bundle 8. By retracting the adjustable firestop material 18, individual items 8a may be quickly and easily added to or removed from the bundle 8 without permanently altering the adjustable firestop material 18. Once items 8a have been added to or removed from the bundle 8, the adjustable firestop material 18 may be once again extended to provide maximum coverage of the central opening 12.

In the illustrated embodiment of the invention, the length of firestop material extending along the sides of the cable bundle 8 is equal to the length of the firestop material from the edge adjacent the front wall 10a to the leading edge 24.

The adjustable fire stop material 18 and stationary 20a-c firestop material may include at least one outer layer of an infrared blocking layer such as a layer of metal foil, a layer of intumescent material, an endothermic material, or a combination of intumescent material and endothermic material, a layer of fiberglass cloth, and a plastic film layer. A preferred construction of the adjustable 18 and stationary 20a-c firestop materials is a multi-layer laminate including an outer layer of a stainless steel foil, an intumescent layer, a fiberglass cloth, and an opposed outer layer of thin plastic and/or metal film or foil. The stainless steel acts as a carrier for the intumescent layer. The fiberglass cloth acts as an insulator during a fire and thereby decreases the thermal conductivity of the firestop. The fiberglass cloth also serves to reinforce the entire system during the hose stream portion of the requisite ASTM fire test. The opposed outer film or foil layer encloses the system and allows instructions or logos to be printed on the firestop material.

Suitable infrared blocking layers include metal foils that reflect a large amount of infrared radiation. A preferred infrared blocking layer material is NEXTEL Flamestopping Dot Paper available from 3M Company, St. Paul, Minn. This material and other vitreous materials reflect a large portion of radiation in the infrared spectrum and are thus useful as infrared radiation blockers. Such materials have the further advantage of having melting points above those temperatures found in most fires. Furthermore, their flexibility/drapability is higher than many metal foils.

The intumescent material contributes to the insulating ability of the firestop material by increasing the total volume of the material upon exposure to fire-like conditions and creating a generally airtight seal around the item in the through-penetration. The intumescent material provides for expansion of the firestop material of the present invention in an unconfined state to at least about 1.5 times the original thickness of the material when exposed to fire-like conditions, preferably at least about three times its original thickness, more preferably, four times its original thickness. For some uses, it is preferable that the firestop material expand to at least about nine times its original thickness. A preferred intumescent material is Interam™ Ultra GS, a graphite based, largely inorganic, flexible, fire resistive, intumescent mat available from the 3M Company, St. Paul, Minn.

Suitable endothermic materials include materials that thermally decompose, typically with the evolution of one or more small molecules such as ammonia, carbon dioxide, and/or water, which volatilize, or which react with one or more other compounds present within the firestop material or the surrounding atmosphere in a manner which provides a net uptake of thermal energy by the system.

Suitable endothermic materials include inorganic compounds that provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4.6H_2O$), calcium sulfate ($CaSO_4.2H_2O$) also known as gypsum, magnesium ammonium phosphate ($MgNH_4PO_4.6H_2O$), magnesium hydroxide ($Mg(OH)_2$), and encapsulated $H_2O$. Preferred endothermic agents include magnesium ammonium phosphate hexahydrate, $MgO._2B_2O_3.9H_2O$, gypsum, and $MgHPO_4.3H_2O$.

A separate removable insert (not shown) may optionally be provided along the leading edge of the adjustable firestop material 18 as shown and described in U.S. Patent Publication No. 2004/0093815, the contents of which are hereby incorporated by reference in its entirety. The insert serves to enhance the flexibility of the apparatus by allowing bundles of varying sizes and shapes to be easily accommodated without cutting or otherwise permanently altering the adjustable firestop material 18 itself.

The insert may have a zigzag configuration that matches the configuration of the adjustable firestop material 18 so that the insert may be arranged in overlapping relation with the adjustable firestop material 18. Thus, if relatively few items 8a are initially installed in the through-penetration 4 (or if the contour of the bundle 8 is uneven and does not match the contour of the leading edge 24 of the adjustable firestop material 18, as described below), the insert may be used to fill unoccupied portion of the through-penetration 4 that is not otherwise filled by the adjustable firestop material 18.

In addition, if items 8a are later added to the through-penetration 4, the insert may be easily removed to provide additional area for the items. It will be recognized that such an insert may be provided along the leading edge 24 of the adjustable firestop material 18 adjacent the bundle 8 and/or along one or both sides of bundle 8 to accommodate uneven cable fill.

Figure 1:
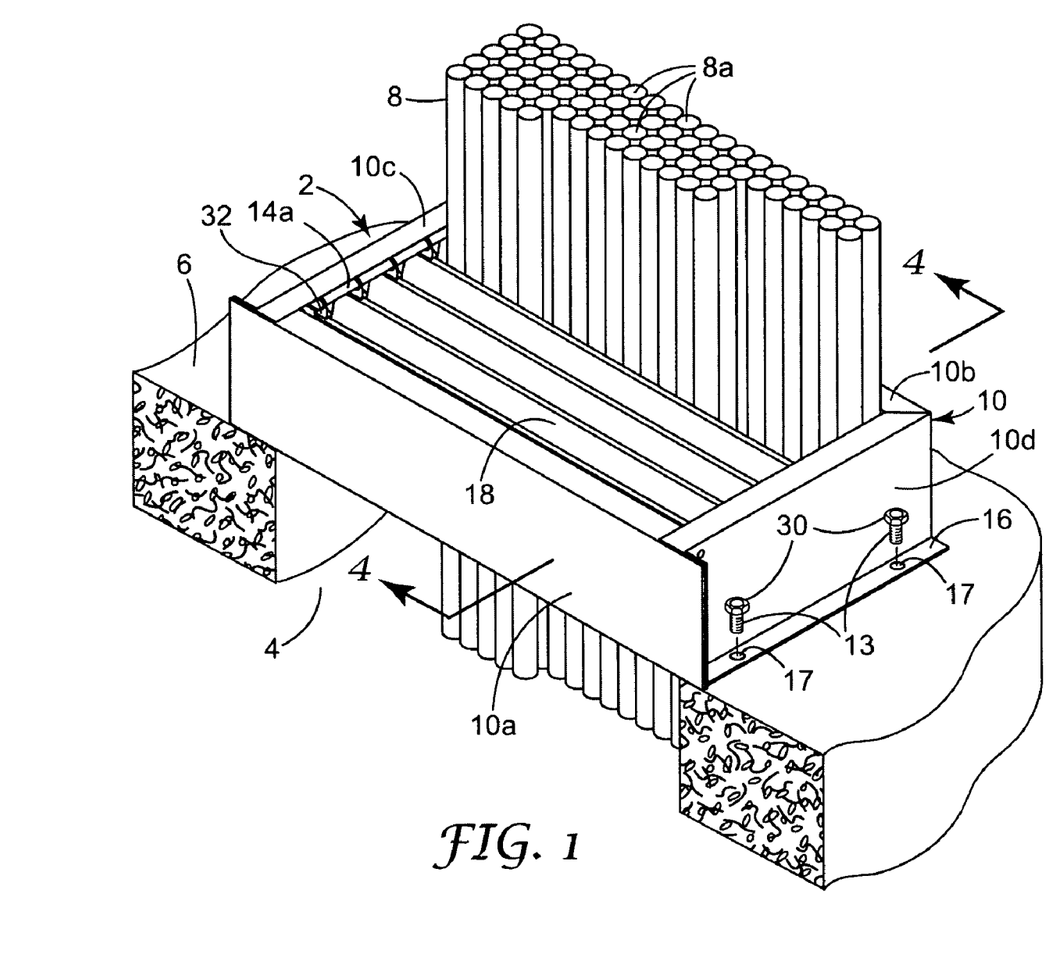
FIG. 1 is a perspective view of the firestopping apparatus installed adjacent to a through-penetration opening according to the invention.
Figure 2:
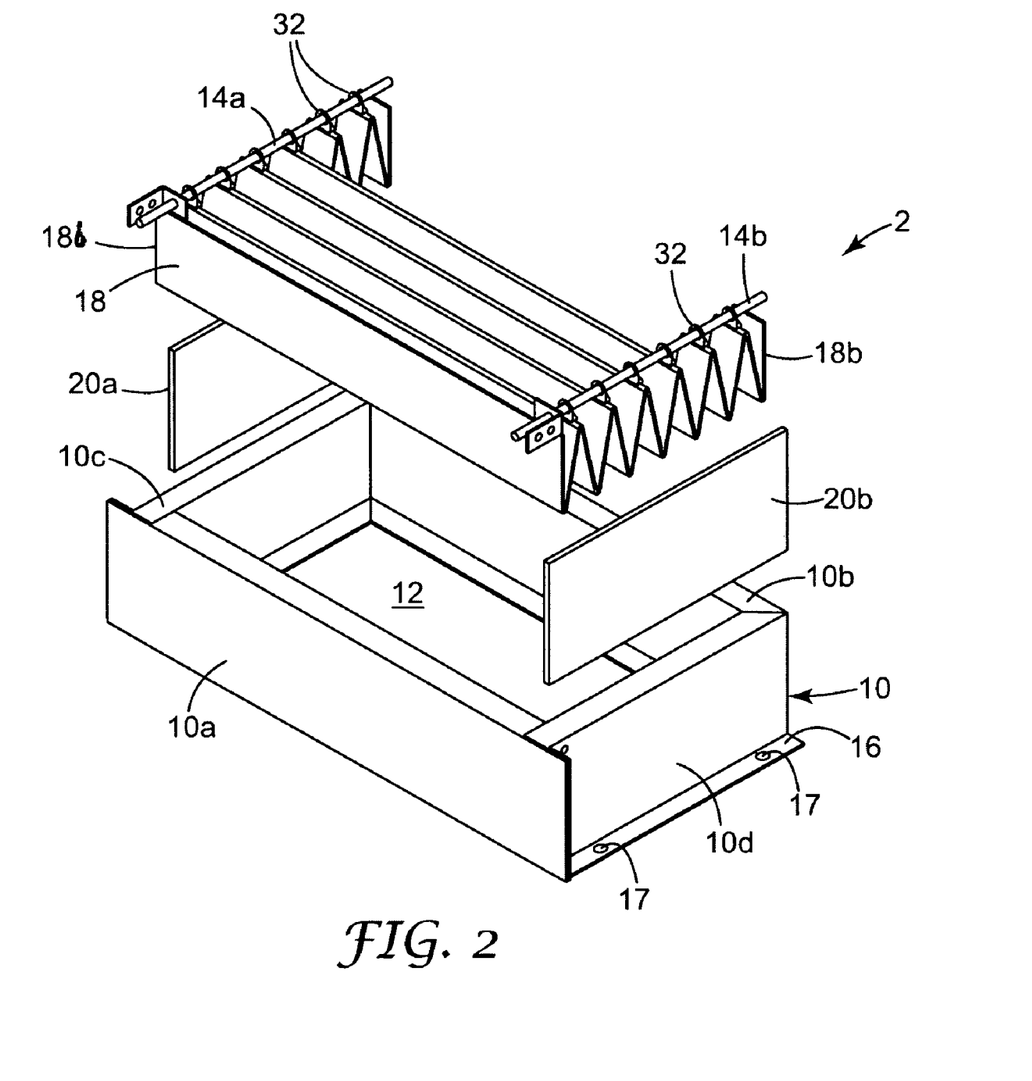
FIG. 2 is an exploded view of the firestopping apparatus of FIG. 1.
Figure 3:
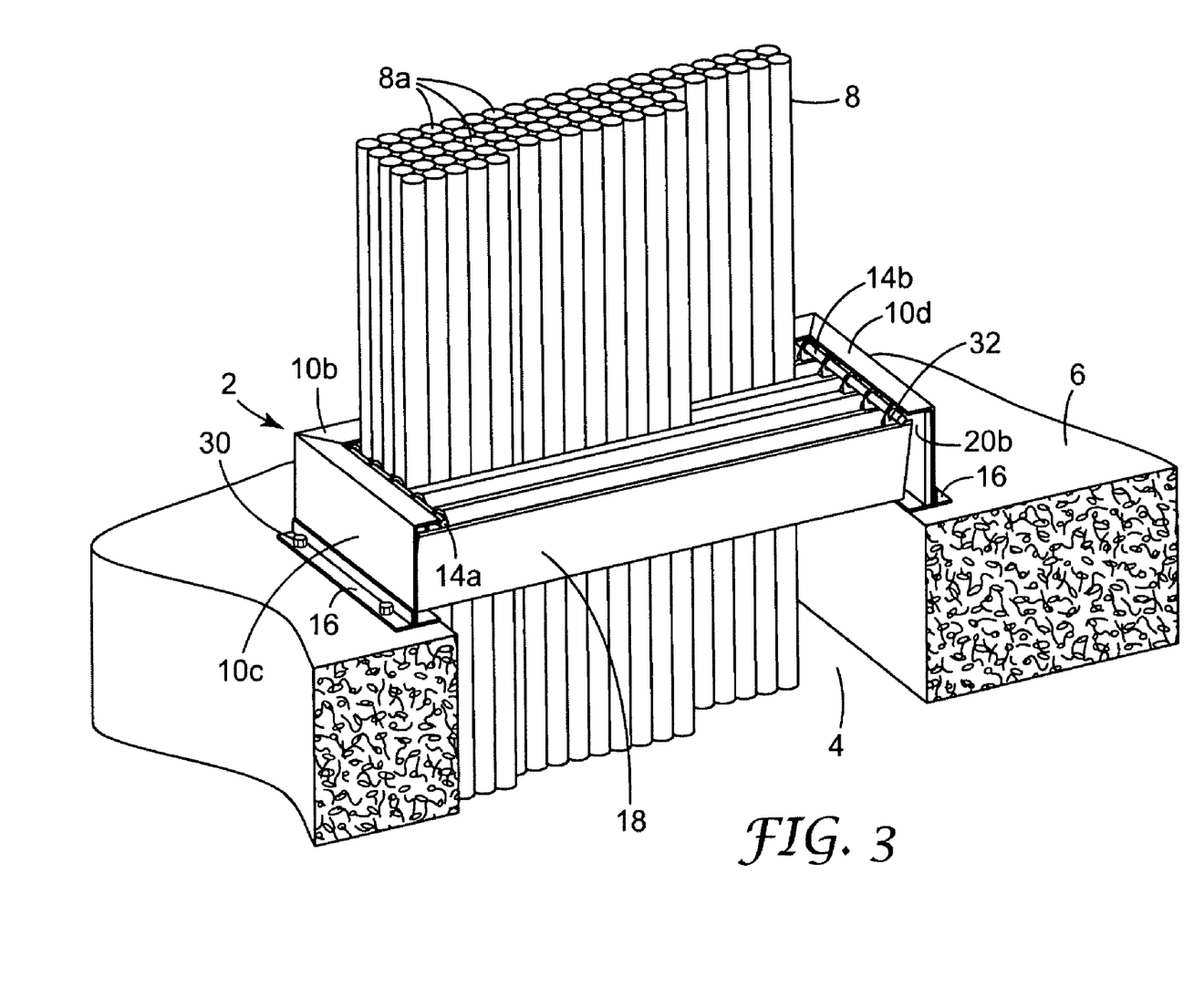
FIG. 3 is a perspective view of the firestopping apparatus of FIG. 1 installed adjacent to a floor opening with the front wall of the apparatus removed to better illustrate the inside of the apparatus.
Figure 4:
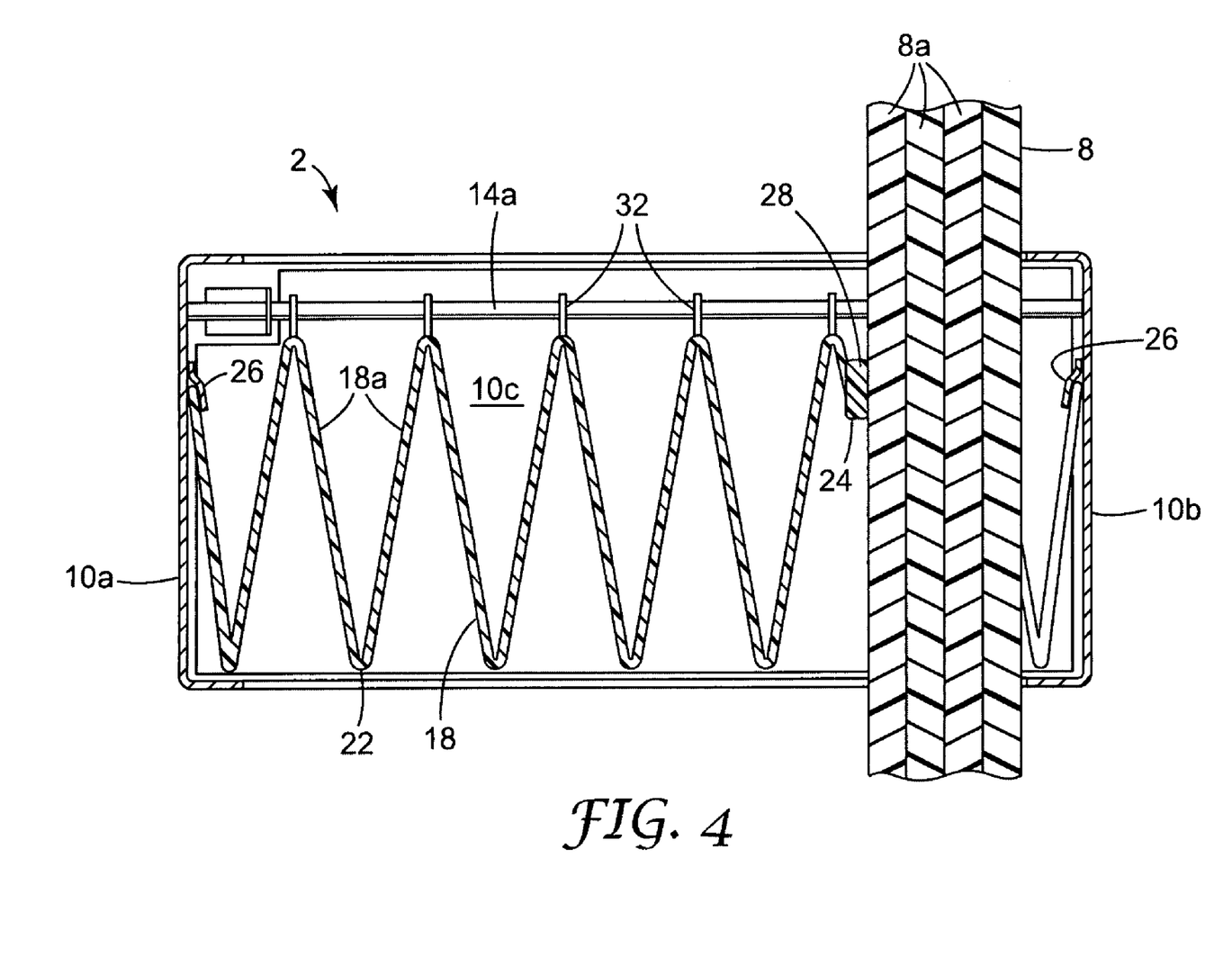
FIG. 4 is a sectional view taken along line 4-4 of FIG. 1.

The insert may also be customized to accommodate bundles 8 having an uneven or countered shape such as the bundle shown in FIGS. 1-3, for example, which has a layer of items 8a ranging from two items thick to four items thick. For such an installation, the insert is simply cut to match the profile of the bundle. If items are later added, the insert may be modified accordingly, or a new insert customized to the new bundle profile can be used.

In the illustrated embodiment, the adjustable firestop material 18 is secured to the inner surface of the housing front wall 10a a clip 26 (FIG. 4), thereby forming a tight seal between the adjustable firestop material 18 and the inner surface of the housing front wall 10a. In addition, the leading edge 24 of the adjustable firestop material 18 is provided with an optional gasket-like surface 28 arranged to engage the cable bundle 8 that is capable of forming an airtight seal with the face of the cable bundle 8. Putty may be used to seal the bundle against firestop material 18. The ends 18b (FIG. 2) of the adjustable firestop material 18 may be provided with similar gasket-like surfaces capable of forming an airtight seal with the associated side walls 10c, 10d of the housing 10. By clipping the adjustable firestop material 18 to the front wall 10a of the housing 10 and providing gaskets along the leading and side edges of the adjustable firestop material 18, the firestop device 2 may prevent smoke or other harmful vapors from passing through the through-penetration.

Connectors 30 containing holes slidably connect the adjustable firestop material 18 with the support rails 14a, 14b. A variety of clips, clamps, and conventional mechanical devices may also be used to slidably attach the adjustable firestop material 18 with the support rails 14a, 14b.

The stationary firestop material 20a-c are a typically sheets or mats of firestop material having a thickness of about ⅛ inch (3.2 millimeters) to about ½ inch (12.7 millimeters). The stationary firestop material 20 is arranged around the adjustable firestop material 18 adjacent the inner surface of the housing 10. The stationary firestop material 20 may be affixed to the inner surface of the housing 10 using conventional means including adhesives or mechanical fasteners.

The device 2 may further include an optional insulating barrier (not shown) arranged either within or around the perimeter of the housing 2 to minimize heat transfer into the surrounding environment. The barrier may be formed of a wide variety of insulating materials including mineral wool and foams such as closed cell foams. The barrier may be attached to the inner or outer surface of the housing 10 using a variety of conventional means including adhesive or mechanical fasteners.

The device 2 may also include a cover plate (not shown) arranged on the top of the housing 10. For safety reasons, it is particularly desirable to include such a cover plate if the device 2 is installed in a floor. The cover may be secured to the top of the housing using conventional fastening means and is preferably installed in a manner that allows the cover plate to be readily removed to allow access to the interior of the device 2.

To provide a firestopping barrier for a through-penetration 4 using the device 2, the device 2 is arranged adjacent the through-penetration 4 such that at least a portion of the housing central opening 12 is aligned with the through-penetration and the housing 10 overlaps a portion of the partition 6. Arranged in this manner, the housing 10 is supported by the partition 6 adjacent the through-penetration 4. In certain installations, the housing 10 may simply rest on the floor adjacent the through-penetration and in other installation, the housing 10 may be fastened to existing hardware provided at the through-penetration site.

Once the housing 10 is arranged adjacent the through-penetration 4, cables 8a or other items can be run though the central opening 12 of the device. The adjustable firestop material 18 is then arranged to fill the area of the central opening not occupied by the cable bundle 8. This is accomplished by simply sliding the adjustable firestop material 18 along the support rails 14a,b until the leading edge 24 abuts the cable bundle 8. An optional insulating barrier (not shown) may be arranged either in or adjacent to the housing 10 to minimize heat transfer into the surrounding environment. In addition, an optional cover plate (not shown) may be provided on the top of the housing 10 over the adjustable firestop material 18.

It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A device for firestopping a through-penetration opening in a partition, said device comprising:
    (a) a housing containing a central opening, wherein the cross-sectional area of the housing is greater than the cross-sectional area of the through-penetration opening, and further wherein said housing is arranged external to the through-penetration opening with at least a portion thereof extending along a surface of the partition thereby to allow the housing to be installed adjacent the through-penetration opening, said housing central opening is greater than said through-penetration opening,
    (b) a first firestop material arranged within said housing, wherein said firestop material is adjustable and comprises a pleated sheet of firestop material that is repeatably and reversibly extendable and retractable toward and away from one or more items passing through the through-penetration opening, thereby allowing additional items to be readily added to the through-penetration opening or removed from the through-penetration opening, and
    (c) further comprising stationary firestop material arranged along said side walls adjacent said central opening, and said housing further comprises an attachment mechanism for movably supporting said first firestop material within said housing.

2. A firestop device as defined in claim 1, wherein said housing includes a front wall, a rear wall and a pair of side walls defining said central opening.

3. A firestop device as defined in claim 1, further comprising an attachment mechanism for securing the housing to the partition adjacent the through-penetration opening.

4. A firestop device as defined in claim 1, wherein said housing is formed of metal.

5. A firestop device as defined in claim 4, wherein said housing is constructed of steel.

6. A firestop device as defined in claim 1, wherein said sheet of firestop material includes a first end secured to said housing and extensions secured to the opposite side of said housing, thereby providing access to said housing central opening, wherein a free edge of the firestop material is available for abutting items passing through the through-penetration opening, said sheet of firestop material further having a zigzag cross-section defining said pleated sheet having a plurality of panels separated by fold lines, wherein each said panel extends perpendicular to the direction in which said firestop material is extendable and retractable.

7. A firestop device as defined in claim 1, wherein said attachment mechanism comprises a pair of elongated support rails extending parallel to the side walls along opposite sides of items passing through the housing central opening.

8. A firestop device as defined in claim 7, wherein said adjustable first firestop material contains a plurality of aligned holes for slidably receiving each said support rail.

9. A device for firestopping an opening in a partition, said device comprising:
    (a) a housing containing a central opening, said housing central opening is greater than the partition opening such that no portion of the partition opening is blocked by the housing;
    (b) a first firestop material arranged within said housing, wherein said firestop material is adjustable and comprises a pleated sheet of firestop material that is repeatably and reversibly extendable and retractable toward and away from one or more items passing through the partition opening, thereby allowing additional items to be readily added to the partition opening or removed from the through-penetration opening; and
    (c) further comprising stationary firestop material arranged along said side walls adjacent said central opening, said housing further comprises an attachment mechanism for movably supporting said first firestop material within said housing.

10. A device as defined in claim 9, wherein said housing includes a front wall, a rear wall and a pair of side walls defining the central opening.

11. A device as defined in claim 10, wherein said housing is arranged adjacent to the surface of the partition, and the device further includes means for securing the device to surface of the partition.

12. A firestop device as defined in claim 11, wherein said housing further comprises a support mechanism for movably supporting said firestop material within said housing.

13. A firestop device as defined in claim 12, wherein said first firestop material is one-piece of firestop material that is repeatably and reversibly extendable and retractable toward and away from an item passing through the opening, thereby to allow items to be added to or items removed from the opening.

14. A firestop device as defined in claim 13, wherein said first firestop material has a zigzag cross section defining a plurality of panels separated by fold lines, wherein each said panel extends perpendicular to the direction in which said firestop material is extendable and retractable.

15. A firestop device as defined in claim 14, further comprising firestop material arranged along said front, rear and side walls adjacent said central opening.

16. A firestop device as defined in claim 15, wherein said support mechanism comprises a pair of elongated support rails extending parallel to the side walls along opposite sides of items passing through the housing central opening.

17. A firestop device as defined in claim 16, further comprising hanging members connected with said firestop material, each said hanging member containing a hole for slidably attaching said hanging member to said support mechanism.

18. A cable penetration structure, comprising:
   (a) a partition having first and second opposed major surfaces and containing an opening extending from said first major surface to said second major surface;
   (b) a housing containing a central opening, wherein the cross-sectional area of the housing is greater than the cross-sectional area of the central opening, and further wherein said housing is arranged external to the opening with at least a portion thereof extending along a surface of the partition thereby to allow the housing to be installed adjacent the opening;
   (c) a first firestop material arranged within said housing, wherein said first firestop material is adjustable and comprises a pleated sheet of firestop material that is repeatably and reversibly extendable and retractable toward and away from one or more items passing through the partition opening, thereby allowing additional items to be readily added to the partition opening or removed from the through-penetration opening; and
   (d) further comprising stationary firestop material arranged along said side walls adjacent said central opening, said housing further comprises an attachment mechanism for movably supporting said first firestop material within said housing.

19. A cable penetration structure as defined in claim 18, wherein said firestop device includes a housing having a front wall, a rear wall and a pair of side walls defining a central opening, and said first firestop material arranged within said housing central opening, wherein said first firestop material includes intumescent material and further wherein when said device is exposed to fire-like conditions and said intumescent material expands, said housing contains the expansion of the intumescent material, thereby causing intumescent material to fill said opening.

20. A method of firestopping an opening in a partition having at least one penetrating item passing through a partition opening, the method comprising the step of arranging a firestop device including a housing having a central opening aligned with said partition opening external to the partition opening, said firestop device including a first firestop material arranged to expand and fill any open space in the central opening upon exposure to fire- like conditions; wherein said first firestop material is adjustable and comprises a pleated sheet of firestop material that is repeatably and reversibly extendable and retractable toward and away from one or more items passing through the partition opening thereby allowing additional items to be readily added to the partition opening or removed from the partition opening; and further comprising stationary firestop material arranged along said side walls adjacent said central opening, and said housing further comprises an attachment mechanism for movably supporting said first firestop material within said housing.

21. A method as defined in claim 20, wherein said firestop device includes a housing having a front wall, a rear wall and a pair of side walls defining said central opening.

* * * * *

UNITED STATES PATENT AND TRADEMARK OFFICE
CERTIFICATE OF CORRECTION

PATENT NO. : 7,665,256 B2　　　　　　　　　　　　　　　　　Page 1 of 1
APPLICATION NO. : 10/925271
DATED : February 23, 2010
INVENTOR(S) : Miller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

Signed and Sealed this

Seventh Day of December, 2010

David J. Kappos
*Director of the United States Patent and Trademark Office*